United States Patent
Suzuki et al.

(10) Patent No.: US 11,251,740 B2
(45) Date of Patent: Feb. 15, 2022

(54) CURRENT SENSOR STATE DETERMINATION DEVICE AND IN-VEHICLE ROTATING ELECTRIC MACHINE SYSTEM HAVING SAME

(71) Applicant: DENSO CORPORATION, Kariya (JP)

(72) Inventors: Takashi Suzuki, Kariya (JP); Daisuke Kobayashi, Kariya (JP); Masaya Taki, Kariya (JP)

(73) Assignee: DENSO CORPORATION, Kariya (JP)

( * ) Notice: Subject to any disclaimer, the term of this patent is extended or adjusted under 35 U.S.C. 154(b) by 339 days.

(21) Appl. No.: 16/021,563

(22) Filed: Jun. 28, 2018

(65) Prior Publication Data

US 2019/0006979 A1   Jan. 3, 2019

(30) Foreign Application Priority Data

Jun. 30, 2017   (JP) .............................. JP2017-128904

(51) Int. Cl.
| | | |
|---|---|---|
| H02P 29/024 | (2016.01) | |
| H02P 27/12 | (2006.01) | |
| B62D 5/04 | (2006.01) | |
| H02P 21/22 | (2016.01) | |
| H02P 25/22 | (2006.01) | |

(52) U.S. Cl.
CPC .......... *H02P 29/0243* (2016.02); *B62D 5/049* (2013.01); *B62D 5/0463* (2013.01); *B62D 5/0475* (2013.01); *B62D 5/0484* (2013.01); *B62D 5/0487* (2013.01); *H02P 21/22* (2016.02); *H02P 25/22* (2013.01); *H02P 27/12* (2013.01); *H02P 29/027* (2013.01)

(58) Field of Classification Search
CPC .................................................. H02P 29/0243
See application file for complete search history.

(56) References Cited

U.S. PATENT DOCUMENTS

| | | | | |
|---|---|---|---|---|
| 2009/0133947 A1* | 5/2009 | Yoshihara | ............. | B60L 15/025 180/65.285 |
| 2009/0140745 A1* | 6/2009 | Williams | ........... | G01R 31/2829 324/522 |

(Continued)

FOREIGN PATENT DOCUMENTS

| | | |
|---|---|---|
| JP | 2014-176229 A | 9/2014 |
| JP | 2015-213666 A | 12/2015 |
| JP | 2018-74879 A | 5/2018 |

*Primary Examiner* — Imran K Mustafa
(74) *Attorney, Agent, or Firm* — Maschoff Brennan

(57) ABSTRACT

A current sensor state determination device determines that an abnormality is caused in a current sensor when a sum of phase currents based on current detection values from each of the current sensors in three phases is greater than a first determination value, and determines that no abnormality is caused in the current sensor when the sum of phase currents is equal to or less than the first determination value. The state determination device determines that the current sensor is normal when it is determined that (i) no abnormality is caused in a preset electric angle range equal to or less than one electric-angle cycle of the rotating electric machine and (ii) a value of an electric current flowing in the rotating electric machine in a rotating coordinates system calculated based on the current detection value is equal to or greater than a second determination value.

9 Claims, 11 Drawing Sheets

(56) References Cited

U.S. PATENT DOCUMENTS

| | | | |
|---|---|---|---|
| 2011/0181292 A1* | 7/2011 | Oowada | G01R 35/00 |
| | | | 324/537 |
| 2012/0274260 A1* | 11/2012 | Takahashi | H02P 29/0243 |
| | | | 318/490 |
| 2014/0253006 A1 | 9/2014 | Satou et al. | |
| 2017/0033725 A1* | 2/2017 | Koseki | H02P 27/08 |

* cited by examiner

NO ABNORMALITY OP.

NO ABNORMALITY OP.

NO ABNORMALITY OP.

NO ABNORMALITY OP.

ABNORMAL OP. (Iwr1 = 0 A)
PHASE CURRENT

ABNORMAL OP. (Iwr1 = 0 A)
|Iur1|+|Ivr1|+|Iwr1|

ABNORMAL OP. (Iwr1 = 0 A)
|qr1|

ABNORMAL OP. (Iwr1 = 0 A)
Sig

COMPARATIVE EXAMPLE

COMPARATIVE EXAMPLE

COMPARATIVE EXAMPLE

COMPARATIVE EXAMPLE

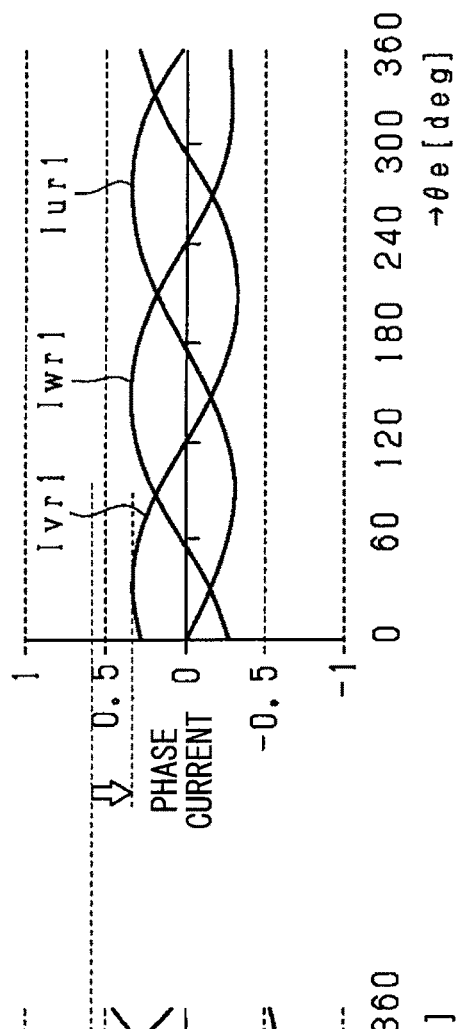
FIG. 10A COMPARATIVE EXAMPLE
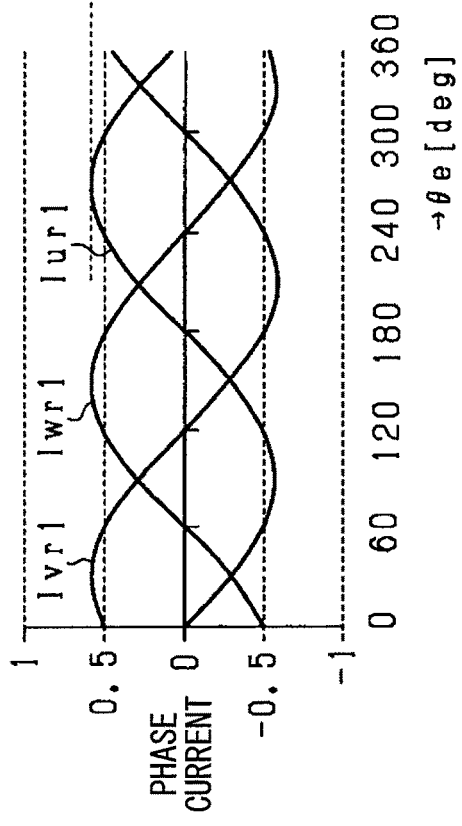
FIG. 10C PRESENT EMBODIMENT
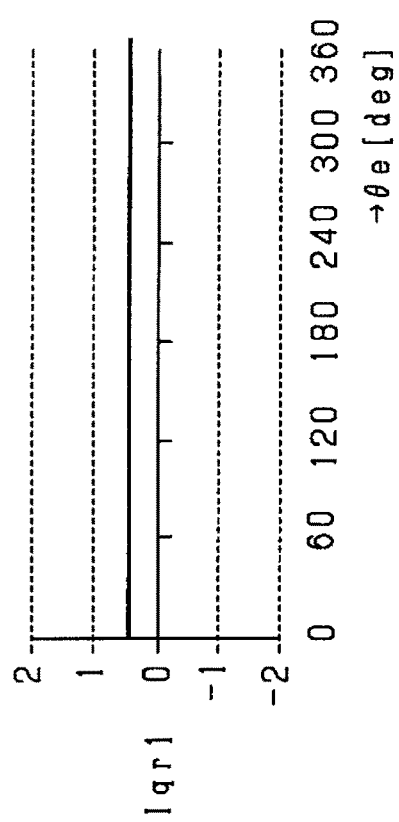
FIG. 10B COMPARATIVE EXAMPLE
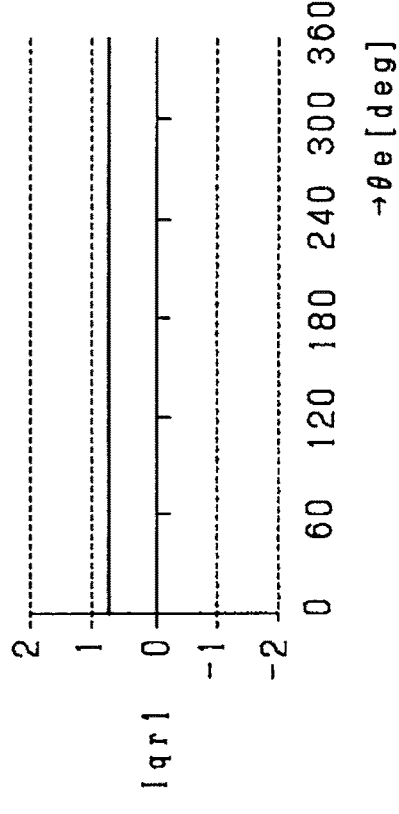
FIG. 10D PRESENT EMBODIMENT

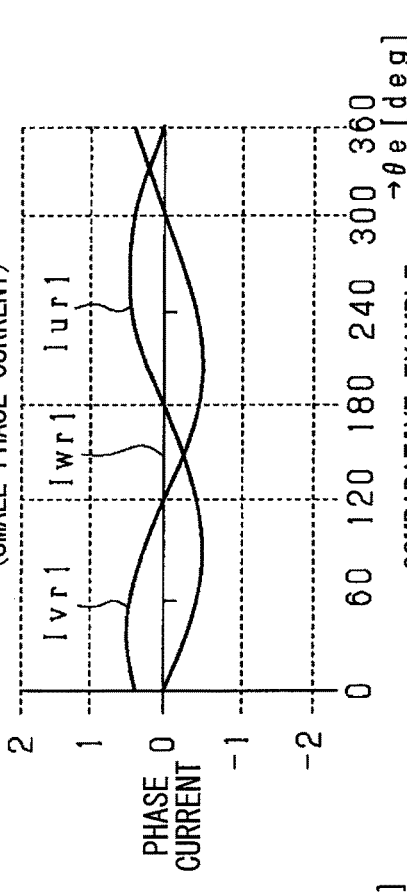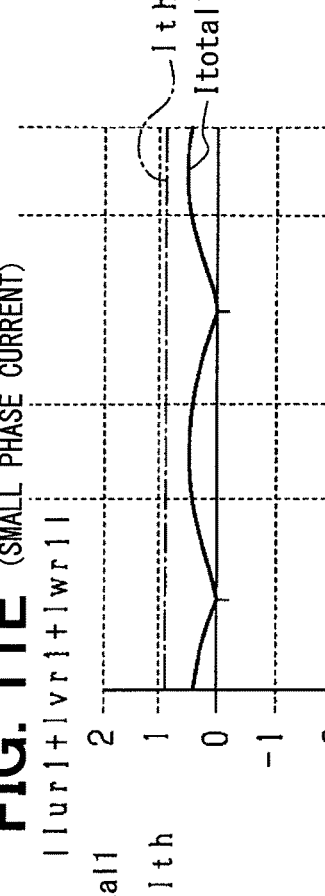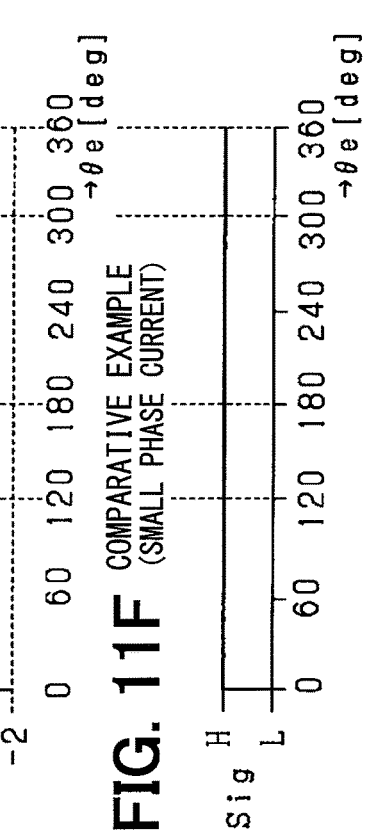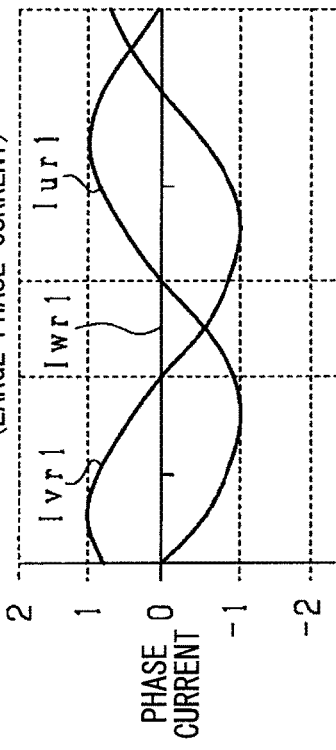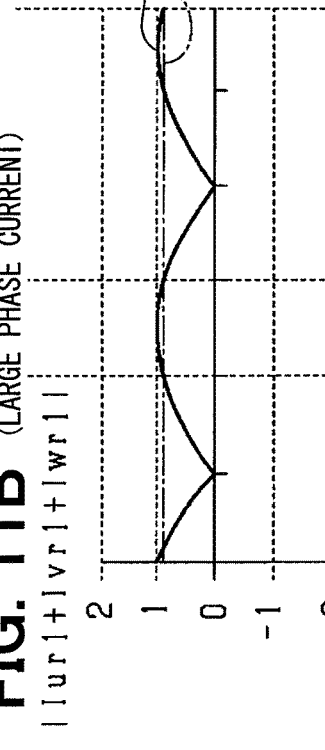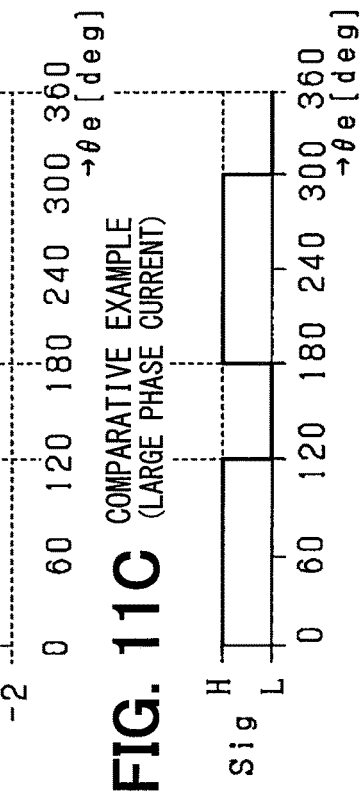

CURRENT SENSOR STATE DETERMINATION DEVICE AND IN-VEHICLE ROTATING ELECTRIC MACHINE SYSTEM HAVING SAME

CROSS REFERENCE TO RELATED APPLICATION

The present application is based on and claims the benefit of priority of Japanese Patent Application No. 2017-128904, filed on Jun. 30, 2017, the disclosure of which is incorporated herein by reference.

TECHNICAL FIELD

The present disclosure generally relates to a current sensor state determination device and an in-vehicle rotating electric machine system having the current sensor state determination device.

BACKGROUND INFORMATION

Conventionally, as disclosed in a patent document 1, i.e. Japanese Patent Application No. 2014-176229, a multi-phase rotating electric machine is controlled by a control system, which includes a current sensor for detecting an electric current in each of the multiple phases of the rotating electric machine, and a power converter that is controlled based on a current detection value from the current sensor for converting a direct current of a direct current power source to an alternating current and for supplying the alternating current to the rotating electric machine.

In the above-described control system, the current sensor may suffer from an abnormality or abnormalities. Therefore, to detect abnormalities in the current sensor, the control system includes a state determination device for detecting and determining that an abnormality is caused in the current sensor. When a phase current is flowing in the rotating electric machine, in cases where no abnormalities are present (i.e., when no abnormality is caused in the current sensor), the sum of the phase currents flowing in the rotating electric machine should logically always equal or approach 0 (zero). On the other hand, when a phase current is flowing in the rotating electric machine, in cases where abnormalities are present (i.e., when an abnormality is caused in the current sensor), a sum of the phase currents flowing in the rotating electric machine does not always become 0. In view of such observation, the state determination device determines that no abnormalities are present in the current sensor when the sum of the phase currents is determined as equal to or less than a first determination value based on the current detection value from the current sensor. On the other hand, the state determination device determines that an abnormality is caused in the current sensor when the sum of the phase currents is determined as greater than the first determination value.

For the improvement of the reliability of the current sensor, not only an abnormality determination of the current sensor (i.e., a determination that an abnormality is caused in the current sensor), but also a normality determination of the current sensor, indicating a normal operation of the current sensor, may preferably be made by the state determination device.

SUMMARY

It is an object of the present disclosure to provide a current sensor state determination device for determining that a current sensor is normal, i.e., normally operating without any abnormalities, and to provide an in-vehicle rotating electric machine system having such a device.

In one aspect of the present disclosure, a current sensor state determination device may include: a current sensor corresponding to one of multiple phase windings of a rotating electric machine and configured to detect a phase current flowing in the phase winding of the rotating electric machine. The current sensor state determination device may further include a power convertor (i) configured to convert a direct current output from a direct current power source to an alternating current under a control based on a current detection value detected by the current sensor and (ii) to supply the converted alternating current to the rotating electric machine. The current sensor state determination device may further include an abnormality determiner configured to determine (i) that an abnormality is caused in the current sensor when a sum of the phase currents calculated based on the current detection value of each phase is greater than a first threshold and (ii) that no abnormality is caused in the current sensor when the sum of the phase currents is equal to or less than the first threshold. The current sensor state determination device may further include a normality determiner configured to determine that the current sensor is normal when (i) the abnormality determiner determines no abnormality in a preset electric angle range equal to or less than one electric-angle cycle of the rotating electric machine, and (ii) a value of an electric current flowing in the rotating electric machine, which is measured in a rotating coordinates system and calculated based on the current detection value, is equal to or greater than a second determination value.

Even when an abnormality is caused in the current sensor, a sum of the phase currents in the multiple phases of the rotating electric machine is always calculated as zero in cases where there is no phase current flowing. Therefore, to determine an abnormality of the current sensor by using the sum of the phase currents in the multiple phases, which is based on the current detection value from the current sensor in each of those phases, the phase current should be actually flowing in those phases (i.e., the phase current needs to be actually flowing). Now, an amplitude of the phase current supplied to the rotating electric machine for the determination of the state of the current sensor can be made smaller when an electric current value in a rotating coordinates system is used as a parameter of determining whether the phase current is actually flowing than when an absolute value of the phase current flowing in each of the multiple phases is used as such parameter.

Therefore, the normality determiner of the present disclosure determines that the current sensor is normal when (i) the abnormality determiner determines no abnormality in a preset electric angle range equal to or less than one electric-angle cycle of the rotating electric machine, and (ii) a value of an electric current flowing in the rotating electric machine, which is measured in a rotating coordinates system and calculated based on the current detection value, is equal to or greater than a second determination value.

According to the present disclosure, the determination that the current sensor is normal can be made using a smaller amplitude of the phase current supplied to the rotating electric machine to determine the state of the current sensor. Further, the normal current sensor determination (i.e., whether the current sensor is normal) may be made more frequently due to the smaller amplitude of the phase current required for such determination.

BRIEF DESCRIPTION OF THE DRAWINGS

Objects, features, and advantages of the present disclosure will become more apparent from the following detailed description made with reference to the accompanying drawings, in which:

FIG. 10A is a comparative example showing a graph of phase current values when a comparative example current sensor has no abnormality;

FIG. 10B is a comparative example showing a graph of a first q-axis current when the comparative example current sensor has no abnormality;

FIG. 10C is a graph showing phase current values when the current sensor in one embodiment of the present disclosure has no abnormality;

FIG. 10D is a graph showing a first q-axis current when the current sensor in one embodiment of the present disclosure has no abnormality;

FIG. 11A is a comparative example showing a graph of phase current values for large phase currents when a comparative example current sensor has an abnormality;

FIG. 11B is a comparative example showing a graph of an absolute value of total currents for the large phase currents when the comparative example current sensor has an abnormality;

FIG. 11C is a comparative example showing a graph of a determination signal for the large phase currents when the comparative example current sensor has an abnormality;

FIG. 11D is a comparative example showing a graph of phase current values for small phase currents when a comparative example current sensor has an abnormality;

FIG. 11E is a comparative example showing a graph of an absolute value of total currents for the small phase currents when the comparative example current sensor has an abnormality; and FIG. 11F is a comparative example showing a graph of a determination signal for the small phase currents when the comparative example current sensor has an abnormality.

DETAILED DESCRIPTION

One embodiment of the present disclosure regarding a current sensor state determination device is described in the following with reference to the drawings. The current sensor state determination device of the present embodiment is part of a rotating electric machine system including an electric power steering device (i.e., an EPS device, hereafter) that assists a steering operation of a driver of a vehicle.

Figure 1:
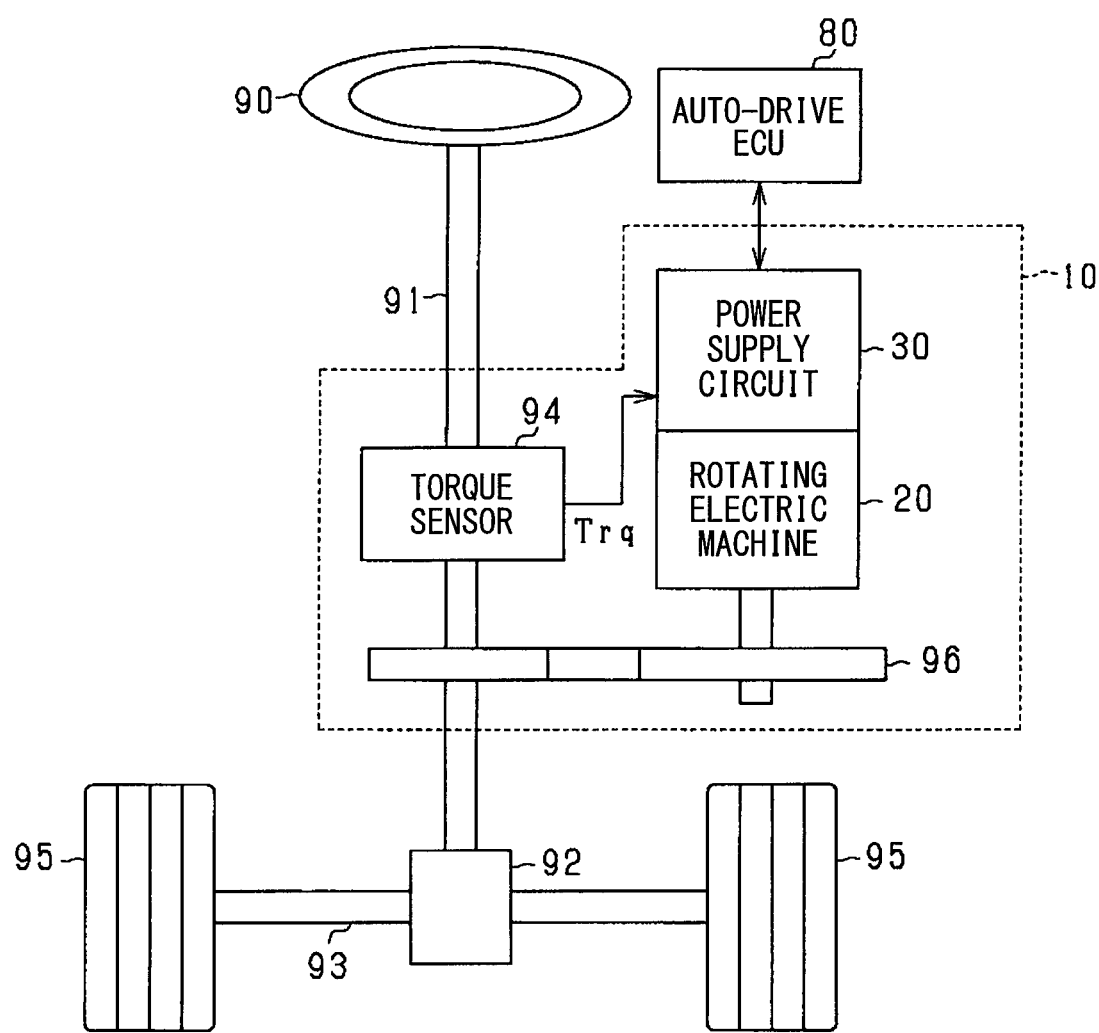
FIG. 1 is a block diagram of an in-vehicle rotating electric machine system in one embodiment of the present disclosure.

As shown in FIG. 1, a vehicle is provided with a steering wheel 90, a steering shaft 91, a pinion gear 92, a rack shaft 93, an EPS device 10, and an auto-drive ECU 80. In the present embodiment, the EPS device 10 and the auto-drive ECU 80 constitutes an in-vehicle rotating electric machine system. The steering shaft 91 is connected to the steering wheel 90. The pinion gear 92 is disposed at a tip of the steering shaft 91. The pinion gear 92 engages with the rack shaft 93. A driving wheel 95 is rotatably connected with both ends of the rack shaft 93 via a tie rod or the like. When the steering wheel 90 is rotated by a driver, the steering shaft 91 rotates. Rotational movement of the steering shaft 91 is converted to translational movement of the rack shaft 93 by the pinion gear 92, and the driving wheel 95 is turned by a steering angle according to the displacement amount of the rack shaft 93.

The EPS device 10 is provided with a torque sensor 94, a speed reducer 96, a rotating electric machine 20, and a power supply circuit 30. The torque sensor 94 is disposed on the steering shaft 91, and detects a steering torque of the steering shaft 91. The rotating electric machine 20 generates an assist torque in accordance with the detected steering torque and a steering direction of the steering wheel 90. The power supply circuit 30 performs a drive control of the rotating electric machine 20. The power supply circuit 30 may also perform a current sensor state determination and may also be referred to herein as a current sensor state determination device. The speed reducer 96 transmits the assist torque to the steering shaft 91, while reducing the rotation speed of a rotor of the rotating electric machine 20.

Figure 2:
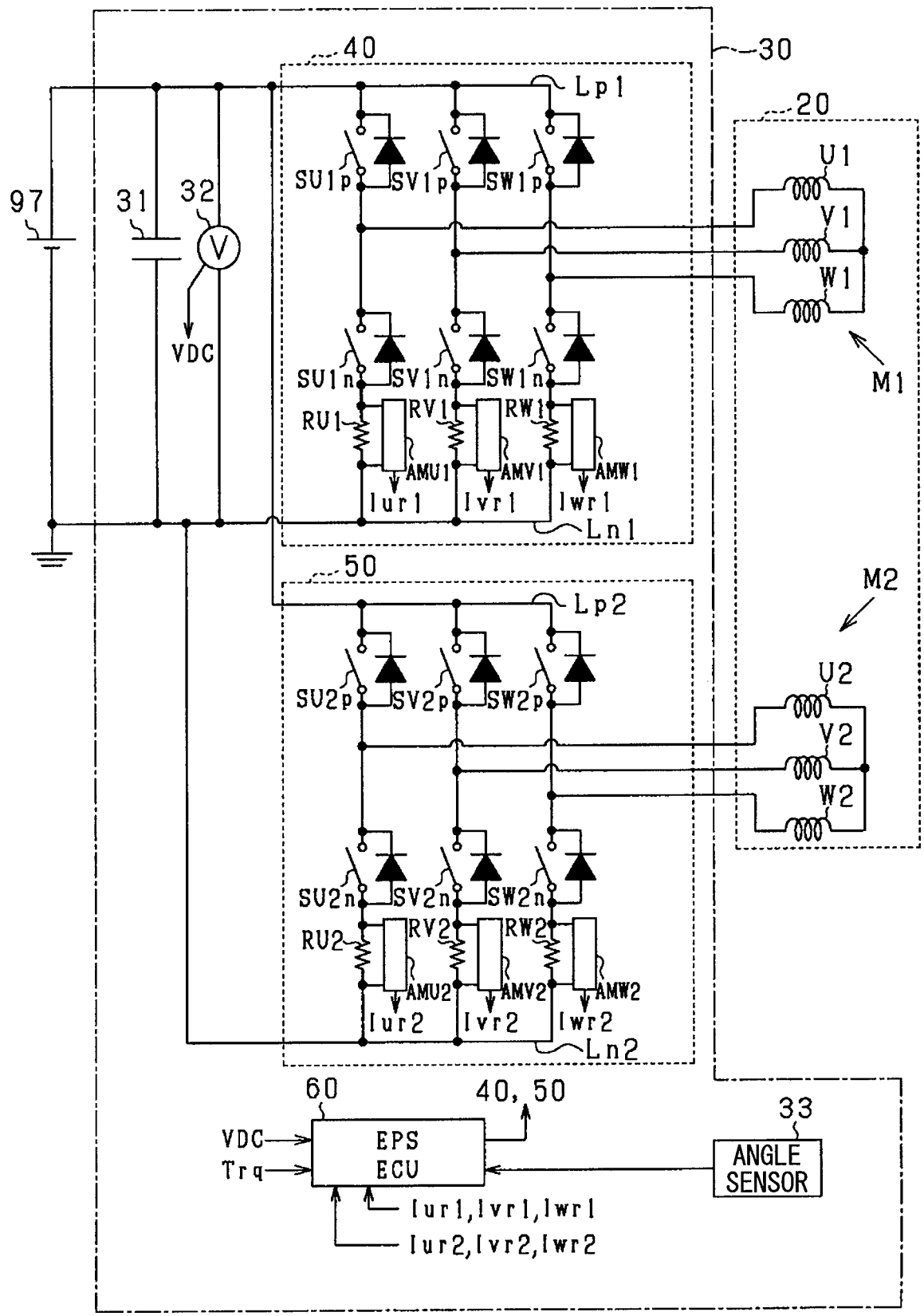
FIG. 2 is a schematic diagram of a power supply circuit and a rotating electric machine.

With reference to FIG. 2, the rotating electric machine 20 and the power supply circuit 30 are described in further detail.

The rotating electric machine 20 may be implemented as a motor of a permanent magnet generated magnetic field type or a winding generated magnetic field type. The stator of the rotating electric machine 20 is provided with a first winding group M1 and a second winding group M2. The first winding group M1 includes a first U phase winding U1, a first V phase winding V1, and a first W phase winding W1 connected in a star shape (e.g., Wye-shaped connection configuration), and the second winding group M2 includes a second U phase winding U2, a second V phase winding V2, and a second W phase winding W2 connected in a star shape. A first end of each of the first U phase winding U1, the first V phase winding V1, and the first W phase winding W1 is connected to a neutral point. The first U phase winding U1, the first V phase winding V1, and the first W phase winding W1 are respectively shifted by 120 degrees in an electric angle from the previous phase. A first end of each of the second U phase winding U2, the second V phase winding V2, and the second W phase winding W2 is connected to the neutral point. The second U phase winding U2, the second V phase winding V2, and the second W phase winding W2 are respectively shifted by 120 degrees in an electric angle from the previous phase.

The power supply circuit 30 is provided with a first inverter 40 and a second inverter 50 respectively serving as a power converter.

In the first inverter 40, for the first U phase, a second end of the first U phase winding U1 is connected to a junction point between upper/lower arm switches SU1p and SU1n. For the first V phase, a second end of the first V phase winding V1 is connected to a junction point between upper/lower arm switches SV1p and SV1n. For the first W phase, a second end of the first W phase winding W1 is connected to a junction point between upper/lower arm switches SW1p and SW1n. In the second inverter 50, for the second U phase, a second end of the second U phase winding U2 is connected to a junction point between upper/lower arm switches SU2p and SU2n. For the second V phase, a second end of the second U phase winding U2 is connected to a junction point between upper/lower arm switches SV2p and SV2n. For the second W phase, a second end of the second W phase winding W2 is connected to a junction point between upper/lower arm switches SW2p and SW2n.

Each of the switches SU1p, SV1p, SW1p, SU1n, SV1n, SW1n, SU2p, SV2p, SW2p, SU2n, SV2n, and SW2n (referred to herein collectively as switches SU1p-SW2n) may be, for example, a voltage control type semiconductor switching element, e.g., an insulated gate bipolar transistor (IGBT) or an N-channel metal oxide semiconductor field effect transistor (MOSFET). A diode is connected to each of the switches SU1p-SW2n reversely in parallel. In the present embodiment, the first and second inverters 40 and 50 and the rotating electric machine 20 constitute a control system.

The power supply circuit 30 is provided with a first high-potential side path Lp1, a first low-potential side path Ln1, a second high-potential side path Lp2, a second low-potential side path Ln2, and a capacitor 31. To a high potential side terminal of each of the upper arm switches SU1p, SV1p, and SW1p in the first U/V/W phase, via the first high-potential side path Lp1, a positive electrode terminal of a battery 97, which is a direct current power supply, is connected. To a low potential side terminal of each of the lower arm switches SU1n, SV1n, and SW1n in the first U/V/W phase, via the first low-potential side path Ln1, a negative electrode terminal of the battery 97 is connected. The negative electrode terminal of the battery 97 is connected to the ground. To a high potential side terminal of each of the upper arm switches SU2p, SV2p, and SW2p in the second U/V/W phase, via the second high-potential side path Lp2 and the first high-potential side path Lp1, the positive electrode terminal of the battery 97 is connected. To a low potential side terminal of each of the lower arm switches SU2n, SV2n, and SW2n in the second U/V/W phase, via the second low-potential side path Ln2 and the first low-potential side path Ln1, the negative electrode terminal of the battery 97 is connected.

Then, a current sensor in the power supply circuit 30 is described. The current sensor of the present embodiment is provided with a shunt resistor and an amplifier.

In the first inverter 40, on a path that connects (i) each of the low potential side terminals of the lower arm switches SU1n, SV1n, and SW1n in the first U/V/W phase and (ii) the first low-potential side path Ln1, first U/V/W phase shunt resistors RU1, RV1, and RW1 are provided. The power supply circuit 30 is provided with first U/V/W phase amplifiers AMU1, AMV1, and AMW1.

The first U/V/W phase amplifiers AMU1, AMV1, and AMW1 respectively output, as first U, V, W phase current values Iur1, Ivr1, and Iwr1, signals of amplified voltage drop amounts by the first U/V/W phase shunt resistors RU1, RV1, and RW1.

The same applies to the second inverter 50. That is, in the second inverter 50, similar to the first inverter 40, second U/V/W phase shunt resistors RU2, RV2, and RW2, and second U/V/W phase amplifiers AMU2, AMV2, and AMW2 are provided.

The second U/V/W phase amplifiers AMU2, AMV2, and AMW2 respectively output, as second U, V, W phase current values Iur2, Ivr2, and Iwr2, signals of amplified voltage drop amounts by the second U/V/W phase shunt resistors RU2, RV2, and RW2.

Figure 3:
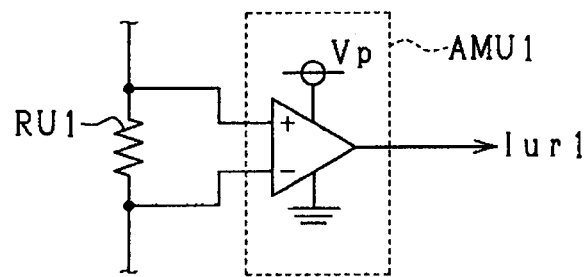
FIG. 3 is a schematic diagram of a current sensor.

When the first U phase is used as an example, as shown in FIG. 3, a constant voltage power supply Vp is connected to a positive electrode power supply terminal of the first U phase amplifier AMU1, and the ground is connected to a negative electrode power supply terminal of the first U phase amplifier AMU1. The output voltage of the constant voltage power supply Vp is 5V, for example.

The power supply circuit 30 is provided with a voltage sensor 32 and an angle sensor 33. The voltage sensor 32 detects a terminal voltage of the capacitor 31 as a power supply voltage VDC. The angle sensor 33 outputs an angle signal according to an electric angle of the rotating electric machine 20. The angle sensor 33 is provided with (i) a magnet which is a magnetic field generation part provided on the rotor of the rotating electric machine 20, and (ii) a magnetism detecting element provided at a position close to the magnet, for example. The output signals of the voltage sensor 32, the angle sensor 33, and the torque sensor 94 are input to an EPSECU 60 (Electric Power Steering Electronic Control Unit), which is a controller in the power supply circuit 30.

The EPSECU 60 is constituted mainly by a microcomputer, and controls each of the switches of the first and second inverters 40 and 50, for controlling the torque of the rotating electric machine 20 by a total instruction torque Trail. The total instruction torque Trail is set based on the steering torque detected by the torque sensor 94, for example. The EPSECU 60 calculates an electric angle θe of the rotating electric machine 20 based on the output signal of the angle sensor 33. Note that functions provided by the EPSECU 60 may be implemented, for example, by software that is recorded on the substantive storage device and a computer/processing element of the EPSECU 60 executing the software. Alternatively, the functions may be realized by using hardware elements alone, for example, as an application-specific integrated circuit (ASIC), field-programmable gate array (FPGA), and like hardware, or by a combination of hardware and software.

Figure 4:
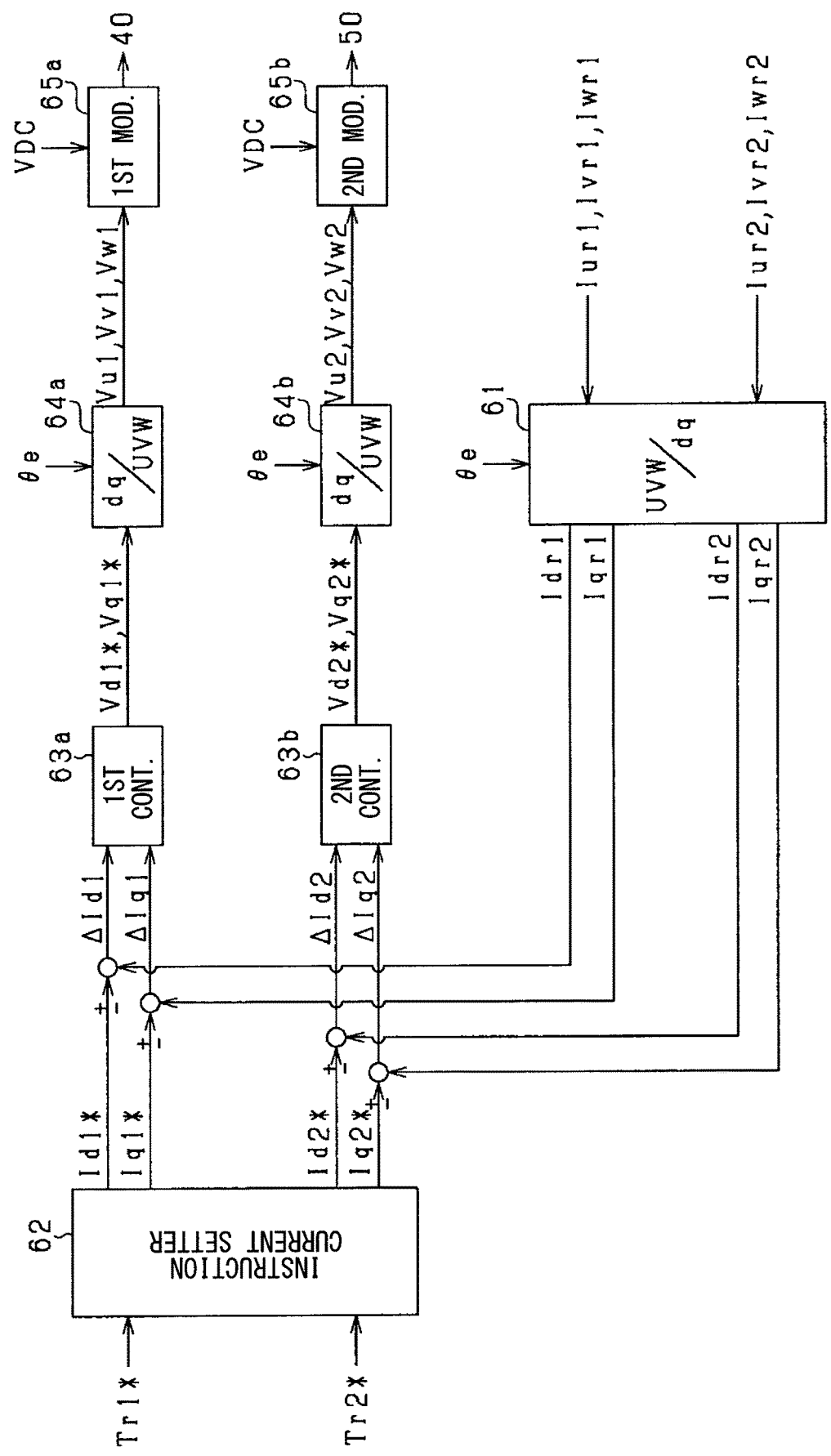
FIG. 4 is a block diagram of elements for a torque control process performed by a controller.

Torque control processing of the rotating electric machine 20 performed by the EPSECU 60 is described with reference to FIG. 4.

A two-phase converter 61 converts U/V/W phase currents Iur1, Ivr1, and Iwr1 in the three-phase fixed/stationary coordinates system of the rotating electric machine 20 to the first d/q-axis currents Idr1 and Iqr1 in the two-phase rotation coordinates system (i.e., a dq coordinates system), based on (i) each of the phase currents Iur1, Ivr1, Iwr1 detected by the current sensor corresponding to the first winding group M1 and (ii) the electric angle θe.

The two-phase converter 61 converts U/V/W phase currents Iur2, Ivr2, and Iwr2 to the second d/q-axis currents Idr2 and Iqr2 in the dq coordinates system, based on (i) each of the phase currents Iur2, Ivr2, Iwr2 detected by the current sensor corresponding to the second winding group M2 and (ii) the electric angle θe.

An instruction current setter 62 sets first d/q-axis instruction currents Id1* and Iq1* for generating and/or controlling a torque corresponding to the first winding group M1 to be realized as a first instruction torque Tr1*, based on the first instruction torque Tr1*. Further, the instruction current setter 62 sets second d/q-axis instruction currents Id2* and Iq2* for generating and/or controlling torques corresponding to the second winding group M2 to be realized as a second instruction torque Tr2*, based on the second instruction torque Tr2*. Each of the first and second instruction torques Tr1* and Tr2* may be set respectively to a one-half value of the total instruction torque Trail, for example.

A first control section 63a calculates a first d-axis instruction voltage Vd1* as an operation amount for performing a feedback control of the first d-axis current Idr1 toward the first d-axis instruction current Id1*. More practically, in order (i) to calculate a first d-axis current deviation ΔId1 as a value that is derived from a subtraction of the first d-axis current Idr1 from the first d-axis instruction current Id1* and (ii) to perform a feedback control for a convergence of the first d-axis current deviation ΔId1 toward 0 (i.e., zero), the first control section 63a calculates the first d-axis instruction voltage Vd1* as a feedback control operation amount. Similarly, the first control section 63a calculates a first q-axis instruction voltage Vq1*, as an operation amount for performing a feedback control of the first q-axis current Iqr1 toward the first q-axis instruction current Iq1*. Note that the feedback control performed by the first control section 63a may be a proportional integral control, for example.

Based on the first d/q-axis instruction voltages Vd1*, Vq1* and the electric angle θe, a first conversion section 64a converts the first d/q-axis instruction voltages Vd1* and Vq1* to first U/V/W phase instruction voltages Vu1, Vv1, and Vw1 in a three-phase fixed coordinates system. In the present embodiment, the first U/V/W phase instruction voltages Vu1, Vv1, and Vw1 are sine wave-shaped signals, among which 120 degrees of phase shift are set in the electric angle between respective phases.

A first modulation section 65a performs a sine wave pulse width modulation (PWM) control, and generates a drive signal for driving, i.e., switching, each of the switches SU1p, SV1p, SW1p, SU1n, SV1n, and SW1n of the first inverter 40 (collectively SU1p-SW1n), based on the first U/V/W phase instruction voltages Vu1, Vv1, Vw1 and the power supply voltage VDC.

More specifically, the sine wave PWM control generates the drive signal based on a large-small comparison between (i) a value derived by dividing each of the instruction voltages Vu1, Vv1, Vw1 by "VDC/2" and (ii) a carrier signal.

Note that the EPSECU 60 is also provided with a second control section 63b, a second conversion section 64b, and a second modulation section 65b. The second control section 63b calculates a second d-axis instruction voltage Vd2* as an operation amount for performing a feedback control of the second d-axis current Idr2 toward the second d-axis instruction current Id2*. Further, the second control section 63b a second/q-axis instruction voltage Vq2* as an operation amount for performing a feedback control of the second/q-axis current Iqr2 toward the second/q-axis instruction current Iq2*. The second conversion section 64b converts the second d/q-axis instruction voltages Vd2*, Vq2* to second U/V/W phase instruction voltages Vu2, Vv2, and Vw2 in a three-phase fixed coordinates system, based on the second d/q-axis instruction voltages Vd2* and Vq2* and the electric angle θe. The second modulation section 65b performs the sine wave PWM control, and generates a drive signal for driving, i.e., switching, each of the switches SU2p-SW2n of the second inverter 50, based on (i) a carrier signal, (ii) the second U/V/W phase instruction voltages Vu2, Vv2, Vw2 and (iii) the power supply voltage VDC.

The auto-drive ECU 80 shown in FIG. 1 performs a normal control and an automated control, among which the normal control controls the inverters 40, 50 to output a torque from the rotating electric machine 20 according to the detected steering torque, and the automated control controls the rotating electric machine 20 to output a torque based on an auto-drive control of a subject vehicle. The auto-drive control described above at least performs a steering operation from among operations for acceleration, steering, and braking.

The auto-drive ECU 80 switches the normal control to the automated control. The auto-drive ECU 80 notifies the EPSECU 60 of the total instruction torque Trail, which is independent of the detected steering torque, when performing the automated control.

Note that, when an abnormality is caused in the current sensor of the power supply circuit 30, the automated control is not properly performable. Therefore, the EPSECU 60 performs a state determination process which determines whether a current sensor is normal, i.e., is normally operating. Based on a condition that the state determination process has determined that the current sensor is normal, the auto-drive ECU 80 allows switching from the normal control to the automated control. Therefore, the auto-drive ECU 80 prohibits the switching from the normal control to the automated control when the current sensor is not determined as normal. In other words, the auto-drive ECU 80 prohibits switching from normal control to automated control when the EPSECU 60 determines an abnormality or malfunction in the current sensor.

The abnormality of the current sensor of the present embodiment is one in which a detected current value adheres to 0 A. In the present embodiment, an upper limit of a current detection range of the current sensor corresponds to an output potential of the constant voltage power supply Vp applied to the positive electrode power supply terminal of the amplifier. Further, a lower limit of the current detection range corresponds to the ground potential applied to the negative electrode power supply terminal of the amplifier. Further, a median of the current detection range is set to 0 A, and the median of the current detection range corresponds to the median of the output potential of the constant voltage power supply Vp and the ground potential. Note that, as another type of abnormality, adherence of the detected current value to the upper limit or the lower limit of the current detection range may be observed. However, an abnormality observed as the adherence of the detected current value to the upper/lower limit is the one that is not normally observable as the current value in the normal operation of the rotating electric machine 20, which is thus easily picked up and determinable as an abnormality by the EPSECU 60. On the other hand, the detected current value adhering to 0 A (zero amp) is not so easily determinable as an abnormality, since such a value is a normal value during the normal drive operation of the rotating electric machine 20. Therefore, it is harder for the EPSECU 60 to properly determine a "0 A adhesion abnormality" than an "upper/lower limit adhesion abnormality."

Now, the state determination process of a current sensor is described first. In the following, how the abnormality of the first inverter 40 is determined is described as a representative example, since the same state determination process is applicable to both of the first inverter 40 and the second inverter 50.

The EPSECU 60 calculates a total current value Itotal1 (=Iur1+Ivr1+Iwr1) which is the total value of each of the three phase currents, based on the first U/V/W phase current values Iur1, Ivr1, and Iwr1. When it is determined by the EPSECU 60 that an absolute value of the calculated total current value Itotal1 is greater than a first determination value Ith, it is determined that an abnormality is caused in the current sensor. When the EPSECU 60 determines that the total current value Itotal1 is equal to or less than the first determination value Ith, it is determined that an abnormality is not caused in the current sensor. The first determination value Ith is a threshold value and may also be referred to as a first threshold.

The EPSECU 60 determines that the current sensor is normal when (i) it is determined that no abnormality is caused in the current sensor over, or at least in, one electric-angle cycle of the rotating electric machine 20 and (ii) it is determined that the first q-axis current Iqr1 is greater than a second determination value Iqth. The second determination value Iqth is a threshold value and may also be referred to as a second threshold.

Figure 5A:
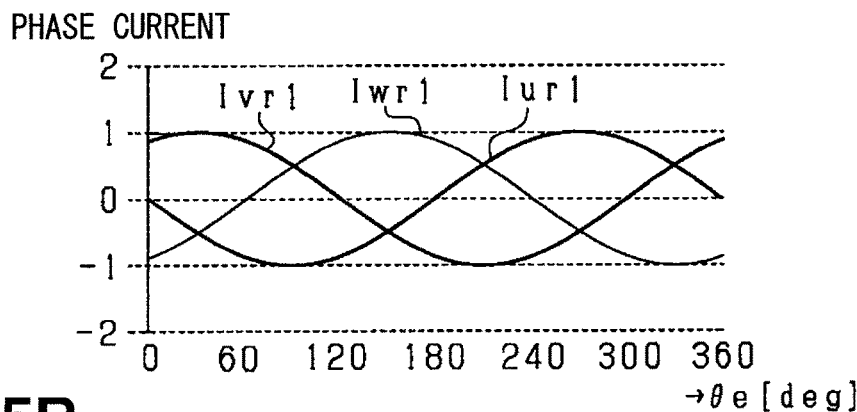
FIG. 5A is a graph of phase current values when the current sensor has no abnormality.
Figure 5B:
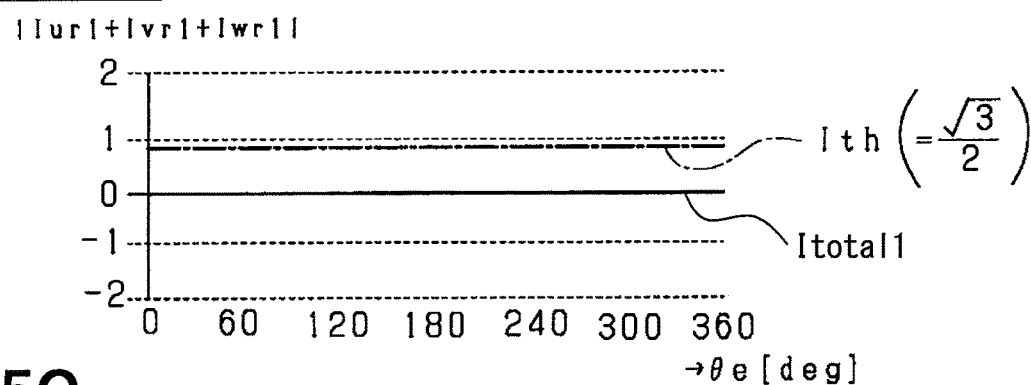
FIG. 5B is a graph of an absolute value of total current values when the current sensor has no abnormality.
Figure 5C:
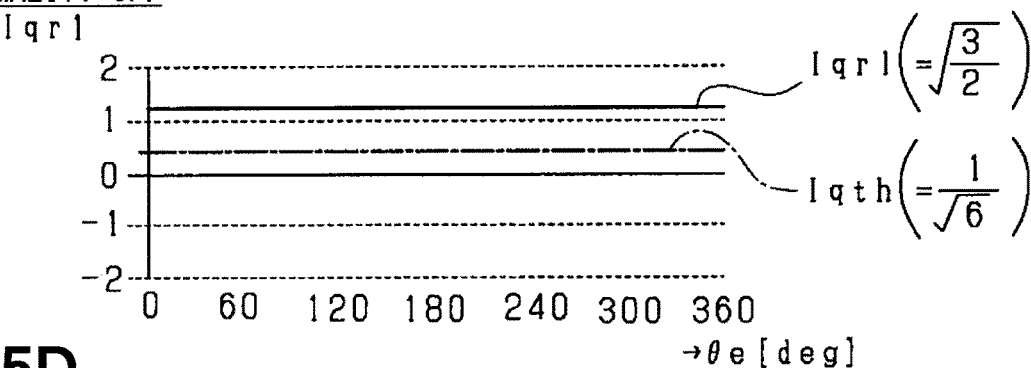
FIG. 5C is a graph of a first q-axis current when the current sensor has no abnormality.
Figure 5D:
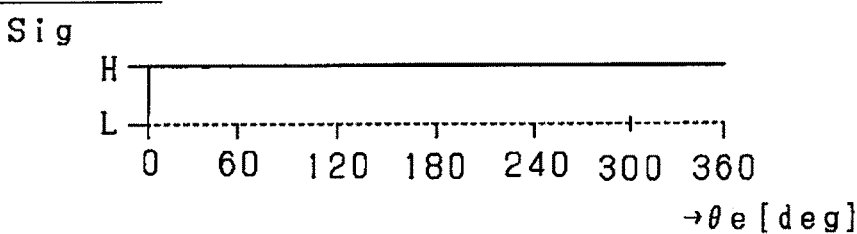
FIG. 5D is a graph of a transition of a determination signal when the current sensor has no abnormality.

In FIGS. 5A-5D, a no abnormality operation (i.e., normal operation) of the rotating electric machine 20 is shown. FIG. 5A shows a transition of each of the first U/V/W phase current values Iur1, Ivr1, Iwr1. FIG. 5B shows a transition of the absolute value of the total current value Itotal1. FIG. 5C shows a transition of the first q-axis current Iqr1. FIG. 5D shows a transition of a determination signal Sig. The determination signal Sig is set to L when the absolute value of the total current value Itotal1 is greater than the first determination value Ith, and is set to H when the total current value Itotal1 is equal to or less than the first determination value Ith. Note that, in FIG. 5A, an amplitude Am of the phase current is set to 1 for convenience.

When no abnormality is caused in the current sensor, the absolute value of the total current value Itotal1 is set to 0 as shown in FIG. 5B.

FIGS. 6A-6D shows an abnormal operation of the current sensor, i.e., when abnormality is caused in a current sensor corresponding to the first W phase. The description of what is illustrated in FIGS. 6A-6D corresponds to the description for FIGS. 5A-5D.

Figure 6A:
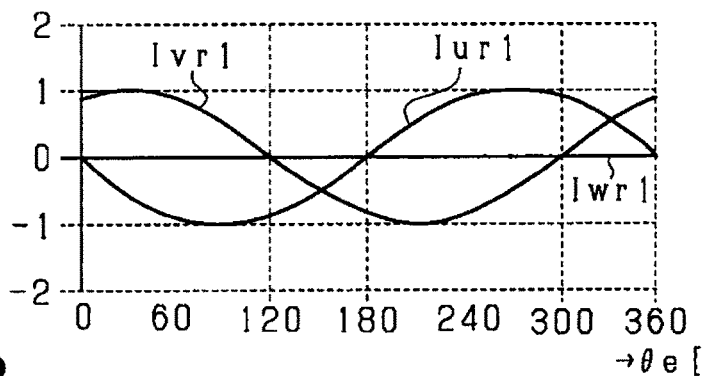
FIG. 6A is a graph of phase current values when the current sensor has an abnormality.
Figure 6B:
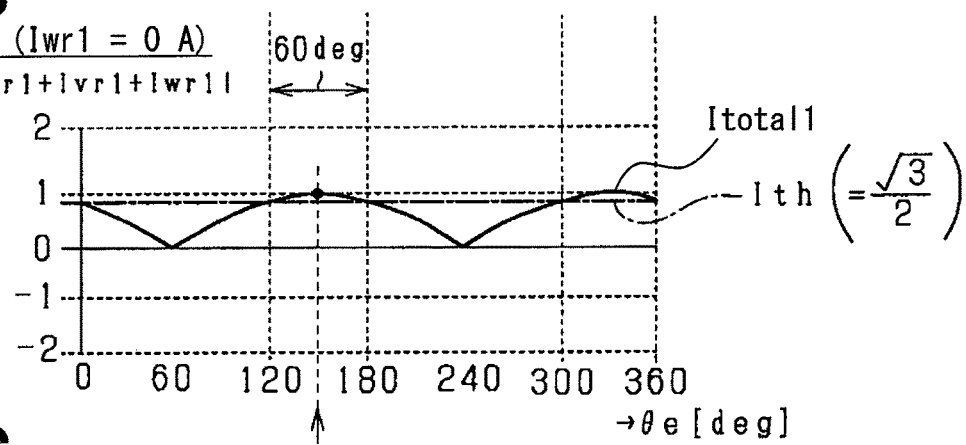
FIG. 6B is a graph of an absolute value of total current values when the current sensor has an abnormality.
Figure 6C:
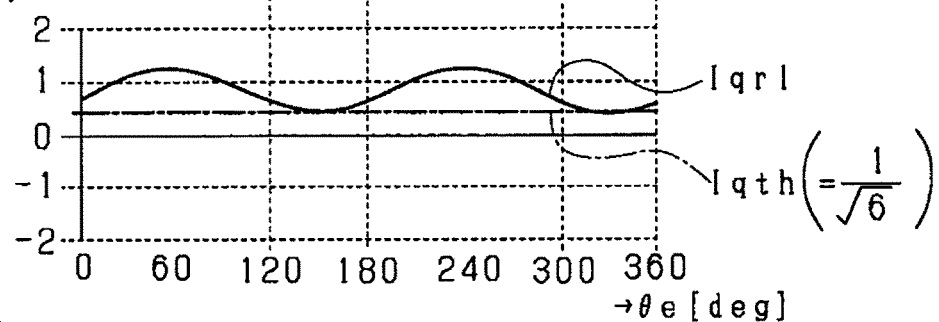
FIG. 6C is a graph of a first q-axis current when the current sensor has an abnormality.
Figure 6D:
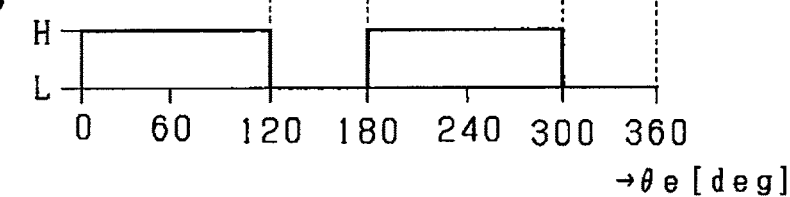
FIG. 6D is a graph of a transition of a determination signal when the current sensor has an abnormality.

As shown in FIG. 6A, the first W phase current value Iwr1 adheres to 0 A. In this case, as shown in FIG. 6B, the absolute value of the total current value Itotal1 will not stay at 0 A. Therefore, it is determinable that an abnormality is caused in the current sensor by comparing (i) the absolute value of the total current value Itotal1 and (ii) the first determination value Ith, which enables a determination that the absolute value of the total current value Itotal1 is not equal to zero. However, even when an abnormality is caused in the current sensor, if no phase current is flowing, the absolute value of the total current value Itotal1 stays at 0 A. Therefore, in order to determine that an abnormality is caused in the current sensor based on the absolute value of the total current value Itotal1, it is necessary that the phase current is actually flowing. In the present embodiment, when the first q-axis current Iqr1 is equal to or greater than the second determination value Iqth, it is interpreted, i.e., determined, that the phase current is flowing. Hereafter, a setting method of the first determination value Ith and the second determination value Iqth is described.

The setting method of the first determination value Ith is first described in the following.

When abnormality is caused in the current sensor in one of the three phases, as shown in FIG. 6B, an electric angle θ1 at which the absolute value of the total current value Itotal1 rises to the maximum is identified. Then, the minimum of the absolute value of the total current value Itotal1 within the range of ±30 degrees centering on the electric angle θ1 is set as the first determination value Ith. The first determination value Ith is represented by the following equation (eq1) by using the amplitude Am of the phase current.

[Equation 1]

$$Ith = \frac{\sqrt{3}}{2} A_m \quad (eq1)$$

For example, in FIG. 5B, the absolute value of the total current value Itotal1 at θe=120 degrees (=2φπ/3) is set as the first determination value Ith. In this case, how it is derived is shown in the following equation (eq2).

[Equation 2]

$$\begin{aligned} Ith &= |I_{ur1} + I_{vr1} + I_{wr1}| \\ &= |-A_m \sin(120°) - A_m(120° - 120°) + 0| \\ &= \frac{\sqrt{3}}{2} A_m \end{aligned} \quad (eq2)$$

Then, the setting method of the second determination value Iqth is described.

A method of coordinate transformation from the first U/V/W phase current values Iur1, Ivr1, Iwr1, to the first d/q-axis currents Idr1, Iqr1 is shown by the following equation (eq3).

[Equation 3]

$$\begin{bmatrix} I_{dr1} \\ I_{qr1} \end{bmatrix} = \sqrt{\frac{2}{3}} \begin{bmatrix} \cos\theta_e & \cos\left(\theta_e - \frac{2}{3}\pi\right) & \cos\left(\theta_e + \frac{2}{3}\pi\right) \\ -\sin\theta_e & -\sin\left(\theta_e - \frac{2}{3}\pi\right) & -\sin\left(\theta_e + \frac{2}{3}\pi\right) \end{bmatrix} \begin{bmatrix} I_{ur1} \\ I_{vr1} \\ I_{wr1} \end{bmatrix} \quad (eq3)$$

The first U/V/W phase current values Iur1, Ivr1, Iwr1 are represented by the following equation (eq4).

[Equation 4]

$$\begin{bmatrix} I_{ur1} \\ I_{vr1} \\ I_{wr1} \end{bmatrix} = -A_m \begin{bmatrix} \sin\theta_e \\ \sin\left(\theta_e - \frac{2}{3}\pi\right) \\ \sin\left(\theta_e + \frac{2}{3}\pi\right) \end{bmatrix} \quad (eq4)$$

The first q-axis current Iqr1 is derived from the equations (eq3) and (eq4), to be represented as follows, i.e., by the following equation (eq5).

[Equation 5]

$$I_{qr1} = \sqrt{\frac{2}{3}} \left\{ -\sin\theta_e \cdot I_{ur1} - \sin\left(\theta_e - \frac{2}{3}\pi\right) \cdot I_{vr1} - \sin\left(\theta_e + \frac{2}{3}\pi\right) \cdot I_{wr1} \right\} \quad (eq5)$$

When no abnormality is caused in the current sensor corresponding to each of the three phases, the first q-axis current Iqr1 is a DC component, as represented by the following equation (eq6).

[Equation 6]

$$I_{qr1} = \sqrt{\frac{3}{2}} A_m \quad (eq6)$$

On the other hand, when an abnormality is caused, for example, in the current sensor corresponding to W phase, it is observed as Iwr1=0. In such case, the first q-axis current Iqr1 is represented by the following equation (eq7).

[Equation 7]

$$I_{qr1} = \sqrt{\frac{2}{3}} A_m \left\{ 1 - \frac{1}{2}\cos\left(2\theta_e - \frac{\pi}{3}\right) \right\} \quad (eq7)$$

The maximum Iqmax1 and the minimum Iqmin1 of the first q-axis current Iqr1 shown by the above equation (eq7) are represented by the following equations (eq8).

[Equation 8]

$$I_{qmax1} = \sqrt{\frac{3}{2}} A_m, \; I_{qmin1} = \frac{1}{\sqrt{6}} A_m \quad (eq8)$$

Therefore, when the first q-axis current Iqr1 is equal to or greater than the minimum Iqmin1, it is determinable that the phase current is flowing. Thus, in the present embodiment, the minimum Iqmin1 is set as the second determination value Iqth. For example, when the abnormality is caused, in which it is observed that Iwr1=0, in the electric angle range of 120-180 degrees where the influence of the phase current adhering to 0 A is easily observable in the total current value Itotal1 (see FIGS. 6A-6D), the first q-axis current Iqr1 becomes smaller than in any other ranges of the electric angle.

In the present embodiment, first to Nth determination ranges are respectively defined as a range of one N-th of 360 degrees in one electric-angle cycle of the rotating electric machine 20. In the present embodiment, N=16 and each of the determination ranges is set as an electric angle range of 22.5 degrees. When the EPSECU 60 determines that (i) no abnormality is caused in a current sensor in each of those electric angle ranges and (ii) the first q-axis current Iqr1 is equal to or greater than the second determination value Iqth, it is determined that the current sensor is normal.

Figure 7:
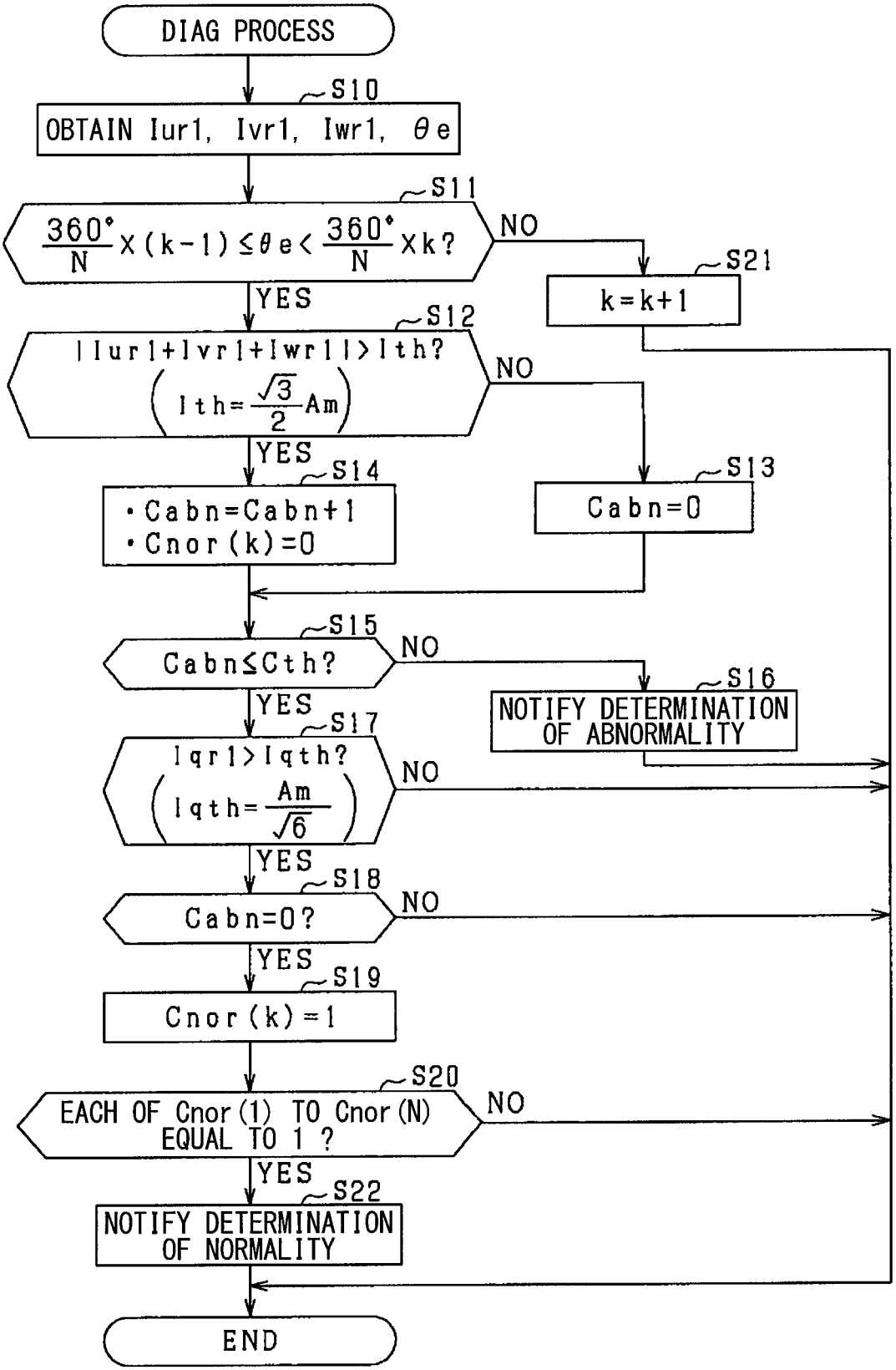
FIG. 7 is a flowchart of a current sensor state determination process.

FIG. 7 shows a procedure of a current sensor state determination process. This process is repeated at preset processing intervals by the EPSECU 60, for example. Note that, in FIG. 7, the process is described as the one corresponding to the first inverter 40.

At Step S10, the EPSECU 60 obtains the first U/V/W phase current values Iur1, Ivr1, Iwr1, and the electric angle θe.

At Step S11, the EPSECU 60 determines whether the obtained electric angle θe is included in the k-th determination range. Note that an initial value of k is 1.

When the EPSECU 60 determines at Step S11 that the obtained electric angle θe is included in the k-th determination range, the process proceeds to Step S12.

At Step S12, based on the first U/V/W phase current values Iur1, Ivr1, Iwr1, the EPSECU 60 calculates the absolute value of the total current value Itotal1. Further, the EPSECU 60 determines whether the calculated absolute value is greater than the first determination value Ith. The processing of Step S12 is where the EPSECU 60 determines whether there is an abnormality with the current sensor. Note that the first determination value Ith includes the amplitude Am of the phase current. Therefore, the first determination value Ith may be, for example, set based on the maximum absolute value from among the absolute values of the first U/V/W phase current values Iur1, Ivr1, Iwr1, i.e., may be set based on the maximum absolute value among the three, which do not adhere to 0 A.

When a negative determination is made at Step S12, the EPSECU 60 determines that no abnormality is caused in the current sensor, the process proceeds to Step S13, and the EPSECU 60 resets an abnormality determination counter Cabn to zero. Note that an initial value of the abnormality determination counter Cabn is zero.

On the other hand, when an affirmative determination is made at Step S12, the EPSECU 60 determines that an abnormality is caused in the current sensor, and the process proceeds to Step S14. At Step S14, the EPSECU 60 increments the abnormality determination counter Cabn by one. Further, the EPSECU 60 sets a k-th normality determination flag Cnor(k) (k=1–N, N=16) to 0. The k-th normality determination flag Cnor(k) indicates that a current sensor is normal in the k-th determination range by taking a value of 1. An initial value of each of the first to N-th normality determination flags Cnor(1) to Cnor(N) is 0. When the EPSECU 60 performs the processing of Steps S12 and S14, the EPSECU 60 corresponds to an abnormality determiner.

After completing the process of Step S13 or S14, the process proceeds to Step S15. At Step S15, the EPSECU 60 determines whether the abnormality determination counter Cabn is equal to or less than a control value Cth which is a positive integer. In the present embodiment, the control value Cth is set to 2 or above.

When the EPSECU 60 determines that the abnormality determination counter Cabn is greater than the control value Cth at Step S15, the process proceeds to Step S16, and the EPSECU 60 finally and conclusively determines that there is an abnormality the current sensor. Further, the EPSECU 60 notifies the auto-drive ECU 80 that there is an abnormality in the current sensor. After the EPSECU 60 performs the processing of Step S16, the process shown in FIG. 7 comes to an end.

When the EPSECU 60 determines that the abnormality determination counter Cabn is equal to or less than the control value Cth at Step S15, the process proceeds to Step S17. At Step S17, based on the first U/V/W phase current values Iur1, Ivr1, Iwr1 and the electric angle θe, the EPSECU 60 calculates the first q-axis current Iqr1. Then, the EPSECU 60 determines whether the calculated first q-axis current Iqr1 is greater than the second determination value Iqth. Note that the second determination value Iqth may be set, for example, based on the maximum absolute value from among the absolute values of the first U/V/W phase current values Iur1, Ivr1, Iwr1, i.e., may be set based on the maximum absolute value among the three, which does not adhere to 0 A.

At Step S17, when the EPSECU 60 determines that the first q-axis current Iqr1 is greater than the second determination value Iqth, the process proceeds to Step S18, and determines whether the abnormality determination counter Cabn is 0. When the EPSECU 60 determines that the abnormality determination counter Cabn is 0 at Step S18, the process proceeds to Step S19, and the EPSECU 60 sets the k-th normality determination flag Cnor(k) to 1.

In subsequent Step S20, the EPSECU 60 determines whether each of the first to N-th normality determination flags Cnor(1) to Cnor(N) is equal to 1. When the EPSECU 60 makes a negative determination at Step S20, the process ends, and subsequent processing during the next cycle proceeds to Step S11 via Step S10. When the EPSECU 60 determines at Step S11 that the obtained electric angle θe is not within the k-th determination range, the process proceeds to Step S21, and the EPSECU 60 increments k by 1.

When the EPSECU 60 makes an affirmative determination at Step S20, the process proceeds to Step S22, and the EPSECU 60 finally and conclusively determines that the current sensor is normal. Further, the EPSECU 60 notifies the auto-drive ECU 80 that the current sensor is normal. Note that, at Step S20, k is reset to 1, and the first to N-th normality determination flags Cnor(1) to Cnor(N) are set to 0. When the EPSECU 60 performs the processing of Step S17-S20, the EPSECU 60 corresponds to a normality determiner. When the EPSECU 60 performs the processing at Step S22, the EPSECU 60 corresponds to a notification unit.

The current sensor state determination processing shown in FIG. 7 may also be similarly applied to (e.g., performed on) the current sensors of the second inverter 50.

Then, a procedure of transition processing from the normal control to the automated control by the auto-drive ECU 80 is described with reference to FIG. 8. This processing is repeated, for example, at preset processing intervals.

At Step S30, the auto-drive ECU 80 determines whether there are instructions to switch from the normal control to the automated control.

When the auto-drive ECU 80 determines that switching is instructed at Step S30, the process proceeds to Step S31. At Step S31, the auto-drive ECU 80 determines whether a notification that indicates an abnormality in the current sensor corresponding to the first inverter 40 or the second inverter 50 is input by the EPSECU 60 during the current state determination process. For example, when the processing of Step S16 of FIG. 7 is performed, a notification that there is an abnormality in the current sensor corresponding to the first inverter 40 is input to the auto-drive ECU 80.

When is the auto-drive ECU 80 determines at Step S31 an abnormality notification is input, the process proceeds to Step S32, and switching from the normal control to the automated control is prohibited thereby avoiding performing the automated control in a situation in which the automated control is not properly performable. As a result, the auto-drive ECU 80 limits and/or prevents a deterioration of safety during vehicle travel.

When the auto-drive ECU 80 determines at Step S31 that no abnormality notification is input, the process proceeds to Step S33, and the auto-drive ECU 80 determines whether a notification that the current sensor corresponding to both of the first inverter 40 and the second inverter 50 is input. For example, when the EPSECU 60 performs the processing of Step S22 of FIG. 7, the EPSECU 60 provides a notification to the auto-drive ECU 80 that the current sensor corresponding to the first inverter 40 is normal.

When the auto-drive ECU 80 makes an affirmative determination at Step S33, the process proceeds to Step S34, and switching from the normal control to the automated control is allowed.

When the auto-drive ECU 80 makes a negative determination at Step S33, the process proceeds to Step S35, and the auto-drive ECU 80 determines whether a preset execution condition is satisfied. The preset execution condition may be, for example, a condition where the vehicle is stopped before starting to travel, e.g. a pre-travel vehicle state.

When the auto-drive ECU 80 makes negative determination at Step S35, the process proceeds to Step S32. On the other hand, when the auto-drive ECU 80 makes an affirmative determination at Step S35, the process proceeds to Step S36.

At Step S36, the auto-drive ECU 80 controls the switches in the first and second inverters 40, 50 to perform a normal power supply pattern to the first winding group M1 and the second winding group M2, i.e., for performing a diagnosis process, in order to finally and conclusively determine that the current sensor corresponding to each of the first and second inverters 40, 50 is normal. When the auto-drive ECU 80 performs the processing of Step S36, the auto-drive ECU 80 corresponds to an enforcement controller.

In the present embodiment, a preset power supply pattern is the one in which a torque generated by the power supply to the first winding group M1 and a torque generated by the power supply to the second winding group M2 cancel with each other. Such a power supply pattern is realizable by setting "Tr1*=−Tr2*" or "Tr2*=−Tr1*." Since no torque is generated in the rotating electric machine 20 according to processing of Step S36, the driver of the vehicle is relieved from experiencing any unusual or strange feelings with the vehicle steering.

The effect of the present embodiment is described with reference to a comparative example.

Figure 9A:
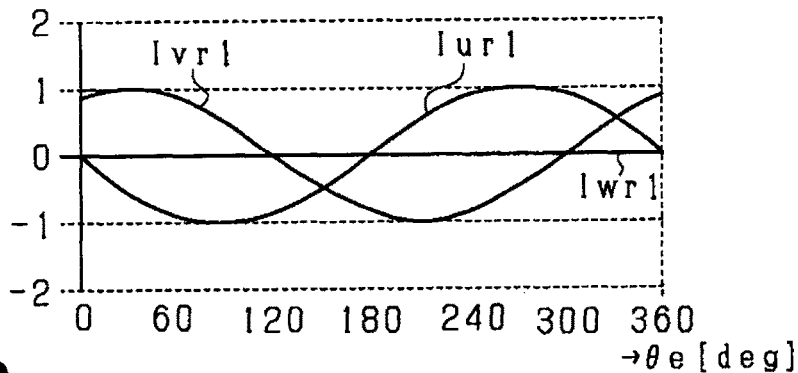
FIG. 9A is a comparative example showing a graph of phase current values when a comparative example current sensor has an abnormality.
Figure 9B:
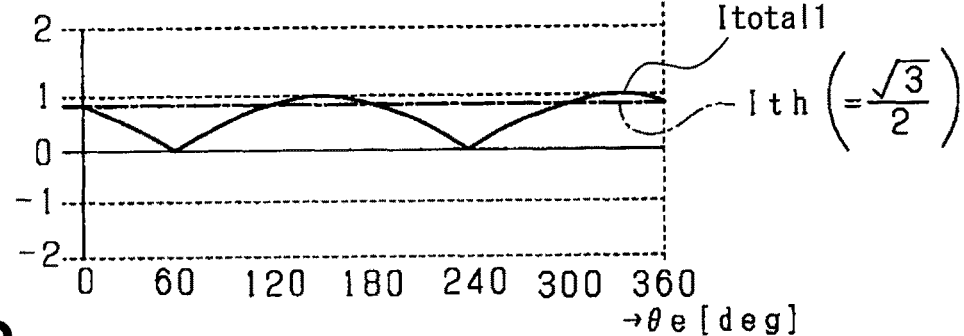
FIG. 9B is a comparative example showing a graph of an absolute value of total current values when the comparative example current sensor has an abnormality.
Figure 9C:
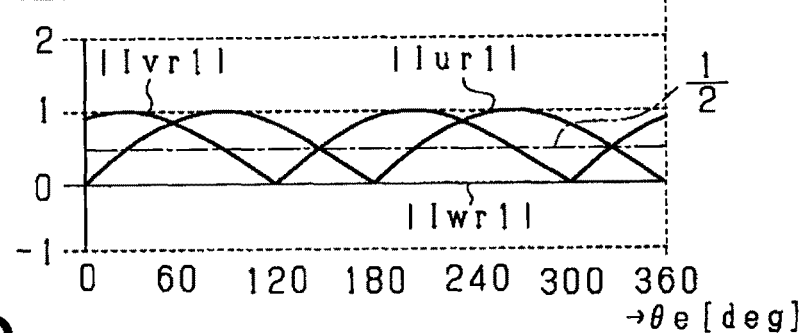
FIG. 9C is a comparative example showing a graph of the phase current values when the comparative example current sensor has an abnormality.
Figure 9D:
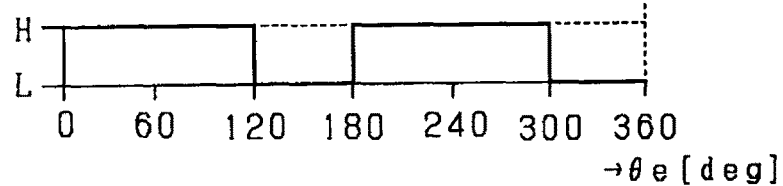
FIG. 9D is a comparative example showing a graph of a determination signal when the comparative example current sensor has an abnormality.

First, a comparative example is described with reference to FIGS. 9A-9D. FIGS. 9A, 9B, 9C, and 9D respectively correspond to FIGS. 6A, 6B, 6C, and 6D. FIG. 9C shows a transition of the absolute value of the first U/V/W phase current values Iur1, Ivr1, Iwr1. In FIGS. 9A-9D, it is assumed that the first W phase current sensor has an abnormality. In FIGS. 9A-9C, the amplitude Am of the phase current is set to 1, for convenience.

The comparative example is different from the present embodiment in that processing performed in Step S17 of FIG. 7 for the present embodiment is replaced with a determination processing in which it is determined whether at least one of the absolute values of the first U/V/W phase current values Iur1, Ivr1, Iwr1 is greater than "½×Am;" as shown in FIG. 9C of the comparative example. Here, the reason why the threshold is set to "½×Am" is based on the fact that, when one of the three phases has its current detection value adhering to 0 A, at least one of the two other, i.e., normal, current detection values from the normal current sensor is equal to or greater than "½×Am."

According to the present embodiment, as shown in FIGS. 10C and 10D, the amplitude of the phase current supplied to the rotating electric machine 20 for the abnormality determination is made smaller than the comparative example shown in FIGS. 10A and 10B. In the comparative example shown in FIG. 10A, the amplitude of the phase current required for making the phase current greater than "½×Am" is $1/(\sqrt{3})\times Am$. In the present embodiment shown in FIG. 10C, the amplitude of the phase current required for making the first q-axis current Iqr1 greater than the second determination value Iqth is "⅓×Am." Therefore, the amplitude of the phase current of the present embodiment shown in FIG. 10C is smaller than the amplitude of the phase current of the comparative example shown in FIG. 10A.

According to the state determination method of the present embodiment, the process for determining that a current sensor is normal may be performed more frequently. That is, when performing the state determination of a current sensor during a travel of a vehicle, the phase current flowing in the rotating electric machine may become small. For example, when the wheels and tires of a vehicle are small (i.e., less contact with the road surface), or the friction coefficient of a road surface is small, the assist torque generated by the rotating electric machine 20 becomes small, and the phase current also may become small.

According to the present embodiment, the amplitude of the phase current supplied to the rotating electric machine 20 for performing the abnormality determination of a current sensor can be made small. Therefore, even when the assist torque becomes small and the phase current flowing in the rotating electric machine 20 becomes small, the frequency of the abnormality determination may be increased.

Note that, in FIGS. 11A, 11B, and 11C a comparative example which has a large phase current is shown. In FIGS. 11D, 11E, and 11F a comparative example which has a small phase current is shown. That is, in both comparative examples, the first U/V/W phase current values Iur1, Ivr1, Iwr1, as shown in FIGS. 11A and 11D, the absolute value of the total current value Itotal1, as shown in FIGS. 11B and 11E, and a transition of the determination signal Sig, as shown in FIGS. 11C and 11F, are shown.

In the comparative example shown in FIGS. 11D-11F, even though the first W phase current value Iwr1 is adhering to 0 A, when the phase currents are small, as shown in FIG. 11D, the absolute value of the total current value Itotal1 does not exceed the first determination value Ith, as shown in FIG. 11E. Therefore, the determination signal Sig is maintained as H, and an abnormality determination for abnormalities caused or occurring in the current sensor cannot be made.

According to the present embodiment described above, while reducing the amplitude of the phase current supplied to the rotating electric machine 20, a determination that a current sensor is normal can be made. Thereby, the reliability of the current sensor may be improved.

Other Embodiments

The above-described embodiment may be modified in the following manner.

The processing at Step S17 of FIG. 7 may be replaced with a process to determine whether the first q-axis current Iqr1 is equal to or greater than the second determination value Iqth.

In the process of Step S17, the first q-axis current Iqr1 may be replaced with the first d-axis current Idr1. In such case, how the second determination value can be set is described as follows.

The first d-axis current Idr1 is represented by the following equation (eq9) based on the equations (eq3) and (eq4).

[Equation 9]

$$I_{dr1} = \sqrt{\frac{2}{3}} \left\{ \cos\theta_e \cdot I_{ur1} + \cos\left(\theta_e - \frac{2}{3}\pi\right) \cdot I_{vr1} + \cos\left(\theta_e + \frac{2}{3}\pi\right) \cdot I_{wr1} \right\} \quad (eq9)$$

When no abnormality is caused in the current sensor corresponding to each of the three phases, the first d-axis current Idr1 is equal to zero (Idr1=0). On the other hand, when an abnormality is caused in the current sensor corresponding to the W phase, for example, it is observed that Iwr1=0. In such case, the first d-axis current Idr1 is represented by the following equation (eq10).

[Equation 10]

$$I_{dr1} = -\sqrt{\frac{2}{3}} \frac{A_m}{2} \sin\left(2\theta_e + \frac{\pi}{3}\right) \quad (eq10)$$

The maximum Idmax1 and the minimum Idmin1 of the first d-axis current Idr1 represented in the equation (eq10) are represented by the following equation (eq11).

[Equation 11]

$$I_{dmax1} = \frac{1}{\sqrt{6}} A_m, \quad I_{dmin1} = -\frac{1}{\sqrt{6}} A_m \quad (eq11)$$

Therefore, when the first d-axis current Idr1 is equal to or greater than the minimum Idmin1, it is determinable that the phase current is flowing. Therefore, the minimum Idmin1 is set as the second determination value.

Further, in the process of Step S17, both of the first d-axis current Idr1 and the first q-axis current Iqr1 may be used. More specifically, a determination may be made regarding whether, for example, a phase current amplitude equivalent value in a rotating coordinates system is greater than the second determination value. In such case, the second determination value is set as a value corresponding to the phase current amplitude equivalent value. The phase current amplitude equivalent value may be, for example, a square root of a sum of a square value of the first d-axis current and a square value of the first q-axis current.

Figure 8:
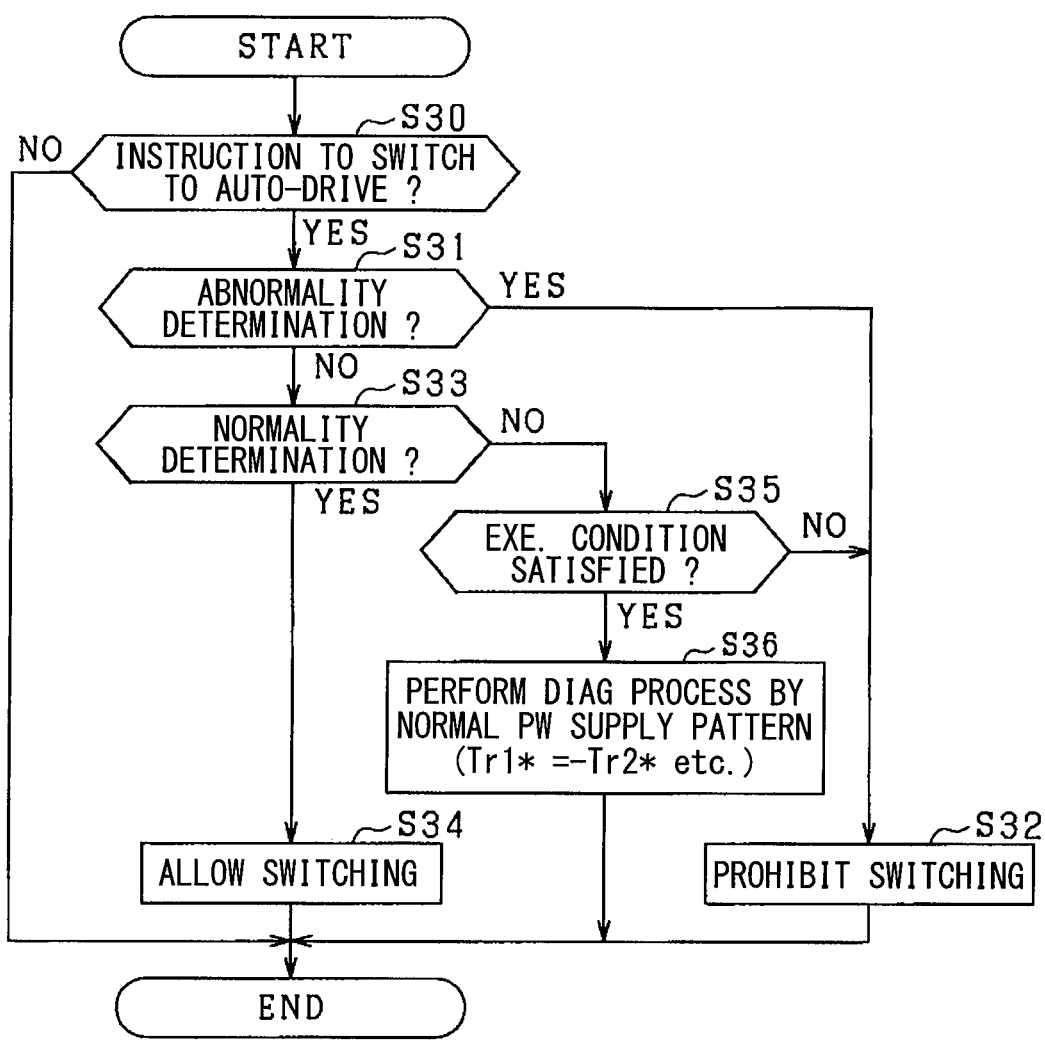
FIG. 8 is a flowchart of an auto-drive transition allowing/prohibiting process.

As for the preset power supply pattern of Step S36 in FIG. 8, the power supply pattern may be one in which (i) the first and second d-axis currents Idr1 and Idr2 are respectively set to a value other than zero and (ii) the first and second q-axis currents Iqr1 and Iqr2 are respectively set to a value of 0 or to a near-zero value.

The first determination value Ith may be set as a value greater than $\sqrt{3}/2 \times Am$. The second determination value Iqth may be set as a value greater than $1/\sqrt{6} \times Am$.

A determination range for performing a normality determination of the current sensor need not be restricted to one sixteenth (1/16) of one electric-angle cycle. For example, the determination range may be a one M-th equal division (i.e., M is an integer of 6 or more) of one electric-angle cycle. The determination range may be more preferably a one L-th equal division of one electric-angle cycle, where L is an integer of 12 or more.

In the above-mentioned embodiment, the current sensor is determined as normal when the EPSECU 60 determines (i) that no abnormality is caused in the current sensor in one electric-angle cycle and (ii) the first q-axis current Iqr1 is greater than the second determination value Iqth. However, such a determination condition may be modifiable.

For example, with reference to FIG. 5A, a condition of no abnormality being caused in the current sensor for electric angle ranges of 15-45 degrees, 75-105 degrees, 135-165 degrees, 195-205 degrees, 255-285 degrees, and 315-345 degrees in one electrical-angle cycle, together with another condition of the first q-axis current Iqr1 being greater than the second determination value Iqth may be used to determine that the current sensor is normal.

In such case, the electric angle range of 15-45 degrees includes an electric angle of 30 degrees at which the absolute value of the first V phase current value Ivr1 is maximized, and the electric angle range of 75-105 degrees includes an electric angle of 90 degrees at which the absolute value of the first U phase current value Iur1 is maximized.

Instead of using the above-described configuration, a different configuration may be used to determine that the rotating electric machine has no disconnection/open-circuit abnormality, in which it is determined based on a condition that (i) the abnormality determiner determines no abnormality in a preset electric angle range within one electric-angle cycle, and (ii) a value of electric current in the rotating electric machine which is calculated based on the current detection value is equal to or greater than the second determination value (Iqth).

In other embodiments, the current sensor may have a different configuration from the one shown in FIG. 3.

In other embodiments, the rotating electric machine may have only one winding group, or the rotating electric machine may have more than two winding groups.

The rotating electric machine system is not restricted to one that constitutes an electric power steering (EPS) device. For example, the above-described embodiment may be applied to other vehicle electrical motors and need not be limited to vehicle electrical motors and rotating electric machines.

Although the present disclosure has been fully described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A current sensor state determination device comprising:
   a current sensor corresponding to one of multiple phase windings of a rotating electric machine and configured to detect a phase current flowing in the phase winding of the rotating electric machine;
   a power converter (i) configured to convert a direct current output from a direct current power source to an alternating current under a control based on a current detection value detected by the current sensor and (ii) configured to supply the converted alternating current to the rotating electric machine;
   a normality determiner configured to determine that the current sensor is normal
   when both of the following conditions are satisfied in each of a plurality of preset electric angle ranges of an electric-angle cycle of the rotating electric machine:
      (i) a sum of phase currents is equal to or less than a first threshold; and
      (ii) a value of an electric current flowing in the rotating electric machine, which is measured in a rotating coordinates system and calculated based on the current detection value, is equal to or greater than a second threshold.

2. The current sensor state determination device of claim 1, wherein
   a preset electric angle range of the plurality of preset electric angle ranges is a range of electric angles including an angle at which an absolute value of the phase current flowing in the rotating electric machine is maximized.

3. The current sensor state determination device of claim 2, wherein
   the preset electric angle range is one electric-angle cycle.

4. The current sensor state determination device of claim 1, wherein
   the value of the electric current flowing in the rotating coordinates system is a q-axis current value.

5. The current sensor state determination device of claim 4, wherein
   the rotating electric machine is a three-phase rotating electric machine,
   the current sensor is not normal for a state in which the current detection value from the current sensor corresponding to one of three phases adheres to 0 A, and
   when an amplitude of the phase current flowing in the rotating electric machine is designated as Am, the second threshold is set as a value equal to or greater than $$\frac{1}{\sqrt{6}} A_m.$$

6. The current sensor state determination device of claim 1, wherein
   the rotating electric machine is a three-phase rotating electric machine,
   the current sensor is not normal for a state in which the current detection value from the current sensor corresponding to one of three phases adheres to 0 A, and
   when an amplitude of the phase current flowing in the rotating electric machine is designated as Am, the first threshold is set as a value equal to or greater than $$\frac{\sqrt{3}}{2} A_m.$$

7. The current sensor state determination device of claim 1 further comprising:

a notification unit configured to notify an external device that the current sensor is normal when the normality determiner has determined that the current sensor is normal.

8. The current sensor state determination device of claim 1, wherein
an abnormality determiner configured to determine that no abnormality is caused in the current sensor when the both conditions of (i) the sum of the phase currents is equal to or less than the first threshold and (ii) the value of an electric current flowing in the rotating electric machine, which is measured in the rotating coordinates system and calculated based on the current detection value, is equal to or greater than the second threshold, and the abnormality determiner configured to determine that an abnormality is caused in the current sensor when only the condition of a sum of the phase currents calculated based on the current detection value of each phase is greater than the first threshold; and
a normality determiner configured to determine that the current sensor is normal when the abnormality determiner determines no abnormality in the each of the plurality of preset electric angle ranges.

9. The current sensor state determination device of claim 1, wherein
the one electric-angle cycle is divided into N electric angle ranges such that each of the plurality of preset electric angle ranges comprises 1/N degrees of the one electric-angle cycle.

* * * * *